United States Patent
Sato et al.

(10) Patent No.: US 7,322,454 B2
(45) Date of Patent: Jan. 29, 2008

(54) FLUID TRANSMITTING DEVICE WITH LOCK-UP CLUTCH

(75) Inventors: Naoto Sato, Hamamatsu (JP); Tokuji Yoshimoto, Hamamatsu (JP); Toru Shimogaki, Hamamatsu (JP); Naomi Takagi, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 179 days.

(21) Appl. No.: 11/184,081

(22) Filed: Jul. 19, 2005

(65) Prior Publication Data

US 2006/0016654 A1    Jan. 26, 2006

(30) Foreign Application Priority Data

Jul. 21, 2004    (JP)    ............................. 2004-212488

(51) Int. Cl.
*F16H 45/02* (2006.01)
(52) U.S. Cl. ...................................... 192/3.29; 192/212
(58) Field of Classification Search ..................... None
See application file for complete search history.

(56) References Cited

U.S. PATENT DOCUMENTS 4,942,059 A * 7/1990 Wilson .................. 219/121.64
5,934,426 A * 8/1999 Hinkel et al. ............... 192/212
2003/0106756 A1* 6/2003 Sato et al. .................. 192/3.29
2004/0094380 A1* 5/2004 Sasse ......................... 129/3.29

FOREIGN PATENT DOCUMENTS

JP         3001853         11/1999

* cited by examiner

*Primary Examiner*—Rodney H. Bonck
(74) *Attorney, Agent, or Firm*—Arent Fox LLP (57) ABSTRACT

In a fluid transmitting device, a plurality of first power transmission claws are inserted between adjacent ones of damper springs and secure to a clutch piston; and a plurality of second power transmission claws are inserted between adjacent ones of the damper springs so as to face the first power transmission claws, and has support portions which are connected to an outer peripheral surface of a shell of a turbine impeller via a weld formed by laser beams. The weld is formed into a linear shape extending along a circumferential direction of the shell so that the weld is melt by the laser beams to extend from an outer surface of the support portion to an inner peripheral surface of the shell. Thus, it is possible to easily perform welding between the support portions of the second power transmission claws and the shell of the turbine impeller, and to easily perform a visual inspection as to whether the welding condition is good or not.

11 Claims, 5 Drawing Sheets

FLUID TRANSMITTING DEVICE WITH LOCK-UP CLUTCH

RELATED APPLICATION DATA

The Japanese priority application No. 2004-212488 upon which the present application is based is hereby incorporated in its entirety herein by reference.

BACKGROUND OF THE INVENTION

1. Field of the Invention

The present invention relates to an improvement in a fluid transmitting device with a lock-up clutch, comprising: a turbine impeller having a shell; and a lock-up clutch including: a clutch piston; an annular spring accommodation groove formed in the clutch piston to accommodate a plurality of annularly-arranged damper springs; a plurality of first power transmission claws inserted between adjacent ones of the damper springs and secured to the clutch piston; a plurality of second power transmission claws inserted between adjacent ones of the damper springs so as to face the first power transmission claws, and having support portions which are connected to an outer peripheral surface of the shell of the turbine impeller via a weld formed by laser beams.

2. Description of the Related Art

Such a fluid transmitting-device with a lock-up clutch is already known, as disclosed in Japanese Patent No. 3001853.

As described above, when the support portions of the second power transmission claws are welded by laser beams on the outer peripheral surface of the shell of the turbine impeller, no spatter occurs as in TIG welding and no cladding such as a weld bead is formed, thus eliminating the need for finishing after welding as well as providing good appearance and cost reduction.

In the above-mentioned device of Japanese Patent No. 3001853, the support portions of the second power transmission claws and the shell of the turbine impeller are welded together by applying laser beams to an inner corner of a portion where they overlap. In this case, however, it is difficult to perform a visual inspection as to whether the welding condition is good or not.

SUMMARY OF THE INVENTION

The present invention has been achieved in view of the above-mentioned circumstances and has an object to provide a fluid transmitting device with a lock-up clutch, wherein the support portions of the second power transmission claws and the shell of the turbine impeller can be easily welded together by laser beams, thereby easily performing a visual inspection as to whether the welding condition is good or not.

In order to achieve the above-mentioned object, according to a first feature of the present invention, there is provided a fluid transmitting device with a lock-up clutch, comprising: a turbine impeller having a shell; and a lock-up clutch including: a clutch piston; an annular spring accommodation groove formed in the clutch piston to accommodate a plurality of annularly-arranged damper springs; a plurality of first power transmission claws inserted between adjacent ones of the damper springs and secured to the clutch piston; a plurality of second power transmission claws inserted between adjacent ones of the damper springs so as to face the first power transmission claws, and having support portions which are connected to an outer peripheral surface of the shell of the turbine impeller via a weld formed by laser beams, wherein the weld is formed into a linear shape extending along a circumferential direction of the shell so that the weld is melt by the laser beams to extend from an outer surface of the support portion to an inner peripheral surface of the shell.

With the first feature, while the laser beams from a laser welding machine are applied to the outer surface of the support portion of the second power transmission claw during welding, the laser welding machine and the shell are relatively rotated about an axis of the shell, thereby easily and reliably forming a linear weld of a desired length, and giving a desired bonding strength between the support portion and the shell. Moreover, since the linear welds normally melt and reach an inner peripheral surface of the shell to form a linear discolored portion on the inner surface, it is possible to easily and reliably determine whether the condition of the weld is good or not only by a visual inspection as to presence or absence of the discolored portions, thereby contributing to an improvement in quality. In addition, since heat input to the welds formed by the laser beams is relatively small, it is possible to prevent any thermal distortion of the shell to provide a stable quality of the turbine impeller.

According to a second feature of the present invention, in addition to the first feature, the linear weld is formed by a plurality of lines juxtaposed to each other with a space therebetween.

With the second feature, the linear weld extending in a circumferential direction of the shell are formed by the plurality of lines juxtaposed to each other with a space therebetween, thereby effectively increasing the bonding strength between the support portion and the shell, and improving the durability of the welds by dispersing stress over the welds during power transmission.

According to a third feature of the present invention, in addition to the first or second feature, each of the second power transmission claws comprises a claw portion and a support portion integrally connected to the claw portion, a width of the support portion in a circumferential direction of the turbine impeller being larger that a width of the claw portion; and the support portion and the shell are connected together via the weld which has a length larger than the width of the claw portion.

With the third feature, the linear welds are formed longer than the width of the claw portion, thereby effectively increasing the bonding strength between the support portion and the shell.

According to a fourth feature of the present invention, in addition to any one of the first to third features, the linear weld is formed so that opposite ends thereof do not reach edges of the support portion.

With the fourth feature, the opposite ends of the linear weld are terminated in front of the edges of the support portion, thereby preventing any chip-off by melting of the edges of the support portion by the laser beams, and preventing the strength from decreasing due to the chip-off by melting of the edges.

According to a fifth feature of the present invention, in addition to anyone of the first to fourth features, a gap surrounding the weld is provided between opposed faces of the support portion and the shell.

With the fifth feature, a gap surrounding the weld is provided between the opposed faces of the support portion and the shell, so that when the linear weld is formed by laser welding, gas generated from the molten weld can be rapidly discharged into the surrounding gap, thus preventing any blow holes from being generated by the gas to form a good-quality weld, which secures a desired and predetermined bonding strength between the support portion and the shell.

According to a sixth feature of the present invention, in addition to the fifth feature, when the support portion is superimposed on the outer peripheral surface of the shell, a radius of the opposed face of the support portion and a radius of the opposed face the shell differ from each other so that the support portion abuts on the outer peripheral surface of the shell at two points in opposite edges in radial directions of the shell, and the weld is formed in an intermediate portion between the two points.

With the sixth feature, it is possible to reliably form the gap surrounding the weld, and reliably discharge the gas generated during the laser welding to the outside through the gap, thereby forming a good weld.

According to a seventh feature of the present invention, in addition to any one of the first to sixth features, a nitridation layer for securing abrasion resistance is formed on the second power transmission claws.

With the seventh feature, the nitridation layer is formed on the second power transmission claws to improve the abrasion resistance of the portions of the second power transmission claws which abut against the damper springs, and the nitrogen gas generated from the nitridation layer is smoothly discharged to the outside, thereby forming good welds.

The above-mentioned and other objects, characteristics, and advantages of the present invention will become apparent from an explanation of preferred embodiments, which will be described in detail below by reference to the attached drawings.

DESCRIPTION OF THE PREFERRED EMBODIMENTS

Preferred embodiments of the present invention will be described by reference to the attached drawings.

Figure 1:
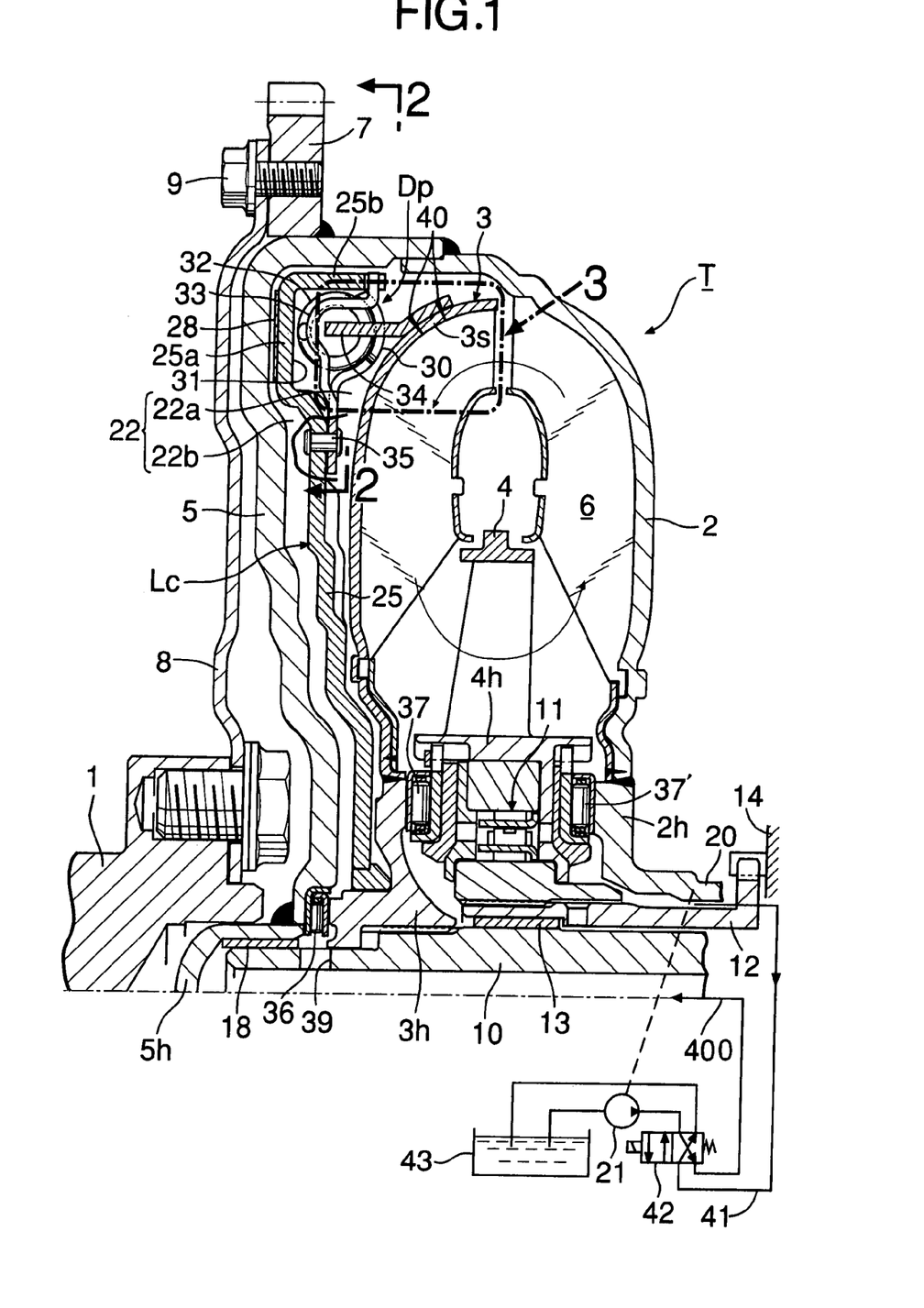
FIG. 1 is a longitudinal side view of a top half portion of a torque converter with a lock-up clutch according to a first embodiment of the present invention.

Referring first to FIG. 1, a torque converter T as a fluid transmitting device includes a pump impeller 2, a turbine impeller 3 disposed to face the pump impeller 2, and a stator impeller 4 inserted between inner peripheral portions of the pump impeller 2 and the turbine impeller 3. A circulation circuit 6 for transmitting a power by a working oil is defined between these three impellers 2, 3 and 4.

A power transmission cover 5 is integrally connected to an outer peripheral portion of the pump impeller 2 by welding to cover an outer side of the turbine impeller 3. Starting ring gears 7 are welded to an outer peripheral surface of the power transmission cover 5. A drive plate 8 coupled to a crankshaft 1 is secured to the ring gears 7 by bolts 9. A thrust needle bearing 36 is interposed between a hub 3h of the turbine impeller 3 and the power transmission cover 5.

An output shaft 10 arranged coaxially with the crankshaft 1 is disposed at a central portion of the torque converter T. The output shaft 10 is spline-fitted to the hub 3h of the turbine impeller 3, and rotatably supported on an inner peripheral surface of a hub 5h of the power transmission cover 5 with a bearing bush 18 interposed therebetween. The output shaft 10 is a main shaft of a multi-stage transmission which is not shown.

A cylindrical stator shaft 12 is disposed around an outer periphery of the output shaft 10, and supports a hub 4h of the stator impeller 4 with a free wheel 11 interposed therebetween. A bearing bush 13 is interposed between the output shaft 10 and the stator shaft 12, to permit the relative rotation of the shafts 10 and 12. An outer end of the stator shaft 12 is non-rotatably supported at its outer end on a transmission case 14.

Thrust needle bearings 37 and 37' are interposed between the hub 4h of the stator impeller 4, and the hubs 2h and 3h of the pump impeller 2 and the turbine impeller 3.

An auxiliary-driving shaft 20 coupled to the hub 2h of the pump impeller 2 is relatively rotatably disposed around an outer periphery of the stator shaft 12, to drive an oil pump 21 for supplying the working oil to the torque converter T.

A clutch chamber 22 is defined between the turbine impeller 3 and the power transmission cover 5, to accommodate a lock-up clutch Lc capable of directly coupling the turbine impeller 3 and the power transmission cover 5 to each other. A clutch piston 25 forming a main member of the lock-up clutch Lc is disposed in the clutch chamber 22, to divide the clutch chamber 22 into an inner chamber 22a on the turbine impeller 3 side and an outer chamber 22b on the transmission cover 5 side. The clutch piston 25 has an annular web 25a bulging toward the power transmission cover 5 side and a rim 25b bending at an outer peripheral edge of the web 25a toward the turbine impeller 3 side. The web 26 is provided with a friction lining 28 opposed to an inner surface of the power transmission cover 5. The clutch piston 25 is slidably supported on an outer peripheral surface of the hub 3h of the turbine impeller 3 so as to axially move between a connected position where the friction lining 28 is pressed on an inner surface of the power transmission cover 5 and a disconnected position where the friction lining 28 is spaced apart from the inner wall.

Figure 2:
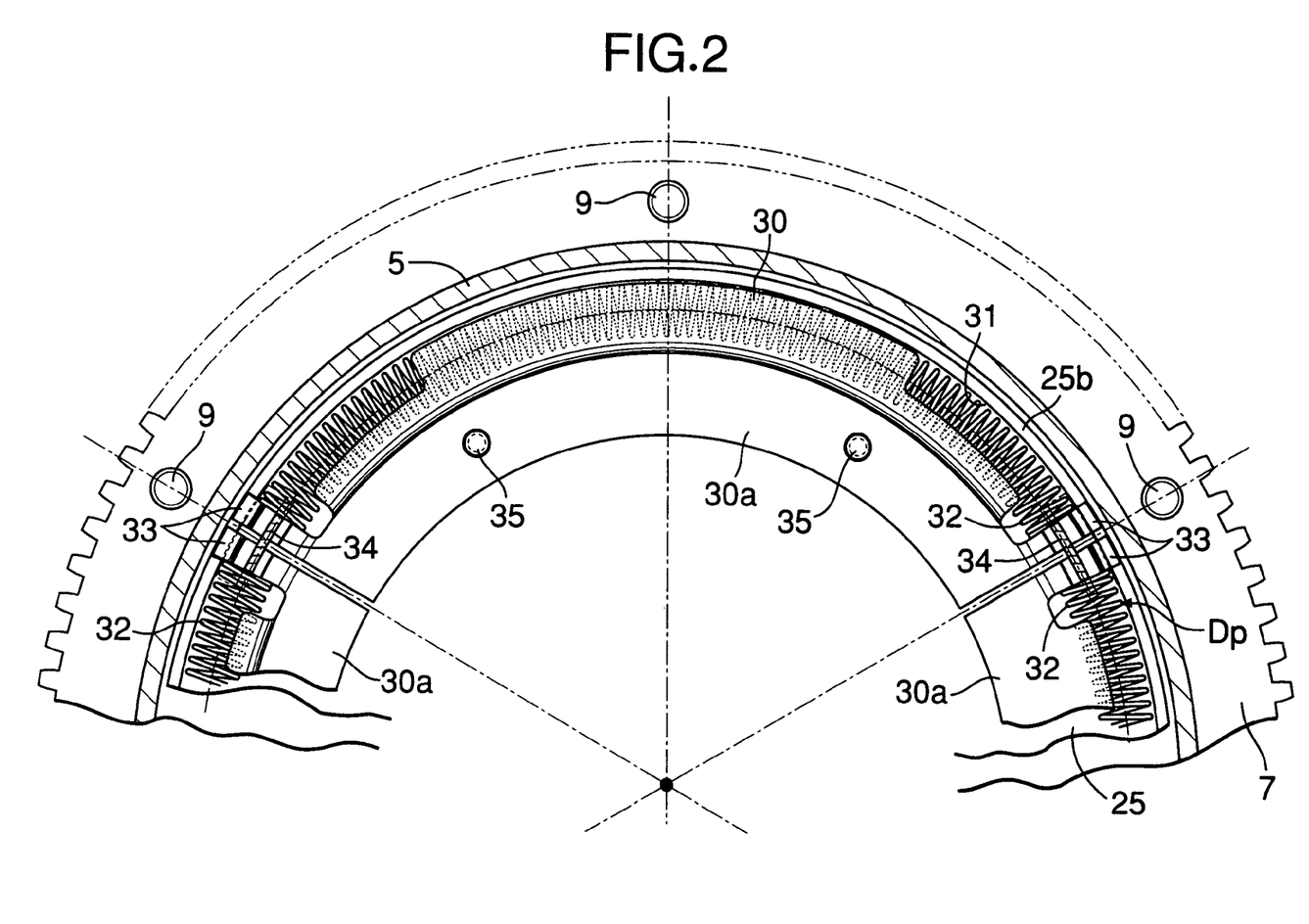
FIG. 2 is a sectional view taken along line 2-2 of FIG. 1.

As shown in FIGS. 1 and 2, a torque damper Dp is also disposed in the clutch chamber 22 to bufferingly connect together the clutch piston 25 and the turbine impeller 3. The torque damper Dp comprises: an annular spring holding member 30 fixed to the clutch piston 25 by a rivet 35 to define an annular spring accommodation groove 31 in cooperation with the rim 25b of the clutch piston 25; a plurality (three in the illustrated example) of annularly-arranged coiled damper springs 32 accommodated in the spring accommodation groove 31; a plurality (the same number as the damper springs 32) of first power transmission claws 33 formed on the spring holding member 30 and inserted between the adjacent damper springs 32; and a plurality (the same number as the damper springs 32) of second power transmission claws 34 welded on an outer peripheral surface of a shell 3s of the turbine impeller 3, opposed to the first power transmission claws 33 and inserted between the adjacent damper springs 32. In the illustrated example, the annular spring holding member 30 comprises a plurality of sector pieces 30a circumferentially divided at the central portions of the first power transmission claws 33. A nitridation layer for securing abrasion resistance is formed beforehand on a surface of each of the second power transmission claws 34.

A first oil passage 400 is provided at the central portion of the output shaft 10 to communicate with the outer chamber 22b of the clutch chamber 22 via a side aperture 39 and the thrust needle bearing 36. Also, a second oil passage 41 is defined between the auxiliary machine driving shaft 20 and the stator shaft 12 to communicate with an inner peripheral portion of the circulating circuit 6 via the thrust needle bearings 37, 37' and the free wheel 11. The first oil passage 400 and the second oil passage 41 are arranged to be alternately connected, through a lock-up control valve 42, to a discharge side of the oil pump 21 and an oil sump 43.

Therefore, in an idling or extremely low operational state of the engine, the lock-up control valve 42 is controlled by an electronic control unit (not shown) so as to connect the first oil passage 400 to the discharge port of the oil pump 21, and on the other hand, to connect the second oil passage 41 to the oil sump 43. Therefore, a torque output from the crankshaft 1 of the engine is transmitted through the drive plate 8 and the power transmission cover 5 to the pump impeller 2 to rotate the pump impeller 2, and when the oil pump 21 is also driven, a working oil discharged by the oil pump 21 flows from the lock-up control valve 42 sequentially via the first oil passage 400, the transverse bore 39, the thrust needle bearing 36 the outer and inner chamber 22b and 22a of the clutch chamber 22 into the circulation circuit 6 to fill the circuit 6, and thereafter flows via the thrust needle bearings 37 and 37' into the second oil passage 41, and returns through the lock-up control valve 42 to the oil sump 43.

Thus, in the clutch chamber 22, the pressure in the outer chamber 22b is higher than that in the inner chamber 22a in virtue of the flow of the working oil as described above, and the clutch piston 25 is retracted away from an inner wall of the power transmission cover 5 by a difference between the pressures in the outer and inner chamber 22b and 22a. Thus, the lock-up clutch Lc is in a turned-off state, to permit the relative rotation of the pump impeller 2 and the turbine impeller 3. Therefore, when the pump impeller 2 is rotatingly driven from the crankshaft 1, the working oil filling the circulation circuit 6 is circulated in the circulation circuit 6 as shown by an arrow, whereby the rotational torque of the pump impeller 2 is transmitted to the turbine impeller 3 to drive the output shaft 10.

If amplification action of torque occurs between the pump impeller 2 and the turbine impeller 3 at this time, an accompanying reaction force is exerted on the stator impeller 4, so that the stator impeller 4 is fixed by a locking action of the free wheel 11.

When the torque amplification action is completed, the stator impeller 4 rotates in the same direction together with the pump impeller 2 and the turbine impeller 3 due to reverse rotation of the torque which the stator impeller 4 receives, while idling the free wheel 11.

When the torque converter T is in such a coupled state, the operation of the lock-up control valve 42 is changed by the electronic control unit. As a result, as opposed to the previous case, the working oil discharged from the oil pump 21 flows from the lock-up control valve 42 through the second oil passage 41 into the circulating circuit 6, fills the circuit 6, then flows to the inner chamber 22a of the clutch chamber 22, and also fills the inner chamber 22a. On the other hand, since the outer chamber 22b of the clutch chamber 22 is opened to the oil sump 43 via the first oil passage 400 and the lock-up control valve 42, the clutch chamber 22 has a pressure in the inner chamber 22a higher than that in the outer chamber 22b. The difference between these pressures presses the clutch piston 25 on the power transmission cover 5 side, and presses the friction lining 28 on the inner wall of the power transmission cover 5, so that the lock-up clutch Lc enters a connected state. Then, the rotational torque transmitted from the crankshaft 1 to the pump impeller 2 is mechanically transmitted from the power transmission cover 5, through the clutch piston 25, the plurality of first power transmission claws 33, the damper springs 32 and the plurality of second power transmission claws 34 to the turbine impeller 3, so that the pump impeller 2 and the turbine impeller 3 enters a directly-coupled state, thereby efficiently transmitting the output torque of the crankshaft 1 to the output shaft 10 to reduce fuel consumption. If any rapid change of torque occurs between the pump impeller 2 and the turbine impeller 3 at this time, the damper springs 32 are compressed between the first and second power transmission claws 33 and 34, and accordingly the pump impeller 2 and the turbine impeller 3 relatively rotate, thereby absorbing a torque shock.

Figure 3:
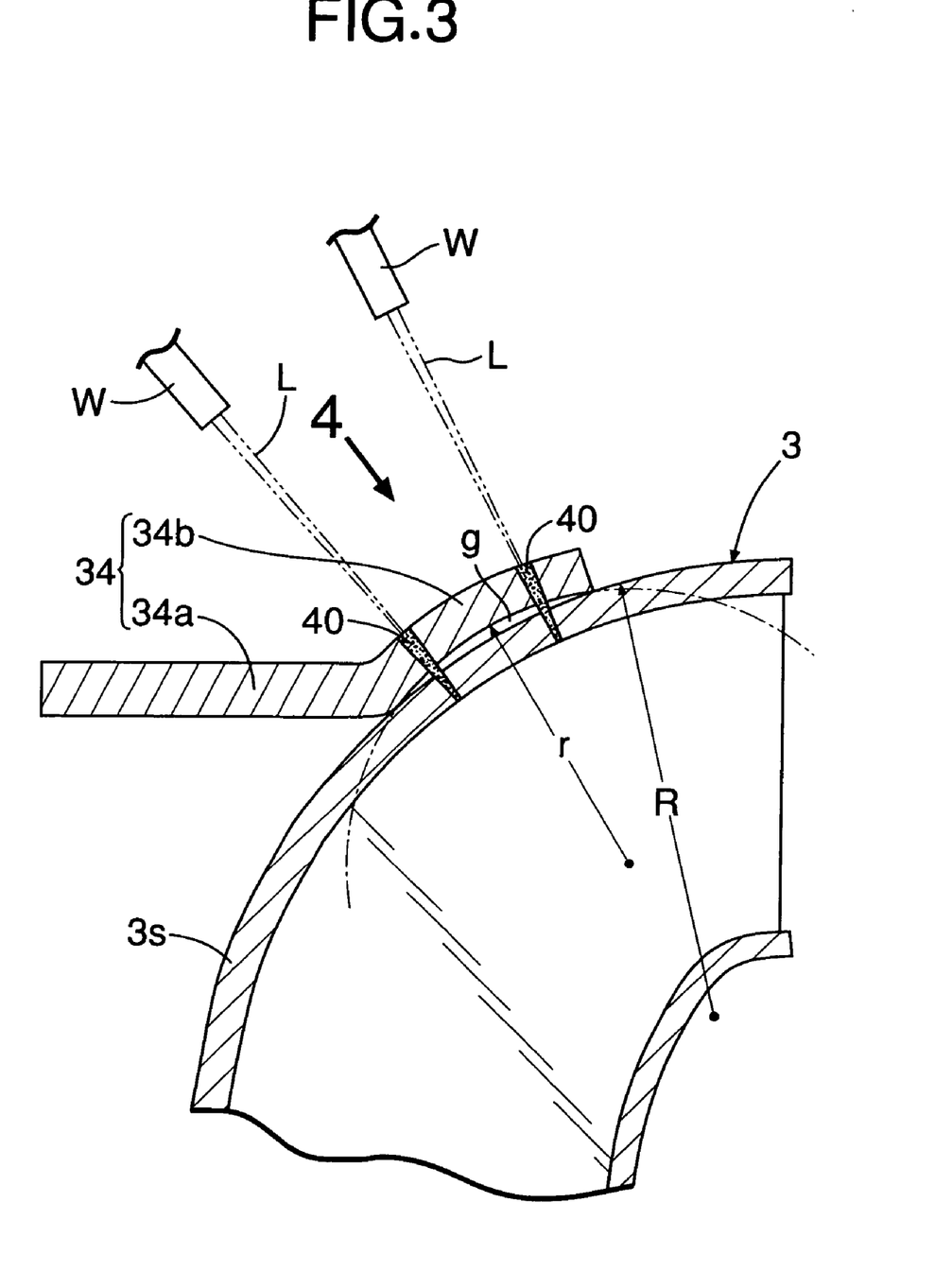
FIG. 3 is an enlarged view of a portion 3 of FIG. 1.
Figure 4:
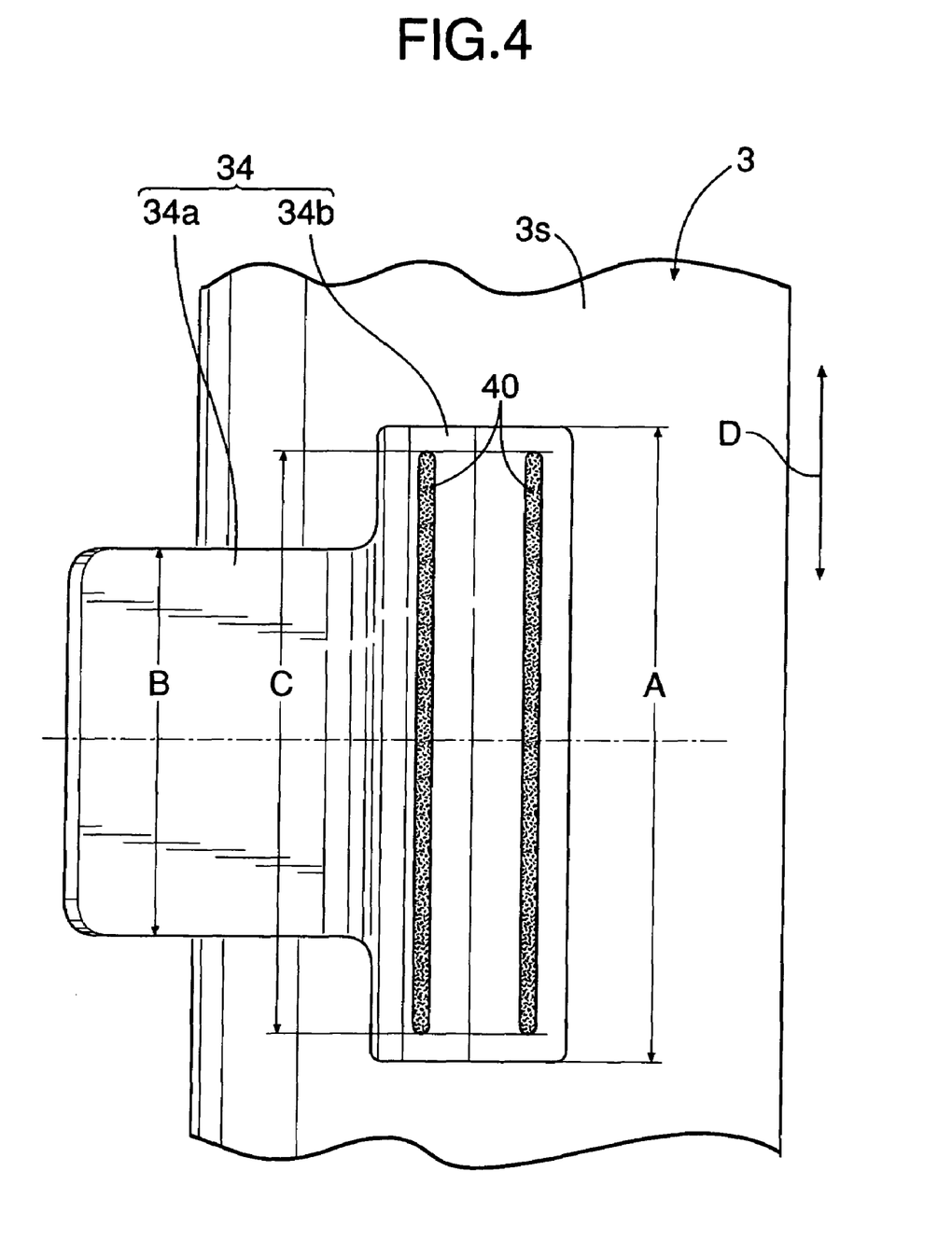
FIG. 4 is a view taken from an arrow 4 in FIG. 3.

In reference to FIGS. 3 and 4, the bonding structure of the second power transmission claw 34 with respect to the outer peripheral surface of the shell 3s of the turbine impeller 3 by laser welding will now be described.

The plurality of second power transmission claws 34 arranged along a circumferential direction of the shell 3s are each separate and independent. Each of the second power transmission claws 34 comprises: a claw portion 34a opposed to the first power transmission claws 33 and inserted between the adjoining damper springs 32; and a rectangular support portion 34b integral with the base of the claw portion 34a. Each of the second power transmission claws 34 is generally T-shaped and is made by punching a steel plate. The width A of the support portion 34b along a circumferential direction D of the turbine impeller 3 is set larger than the width B of the claw portion 34a. The support portion 34b is bonded to the outer peripheral surface of the shell 3s of the turbine impeller 3 via the welds 40 formed by laser beams L applied by a laser welding machine. The welds 40 are formed linearly along a circumferential direction of the shell 3s so that the welds 40 are melted by the laser beams L and extend from the outer surface of the support portion 34b to the inner peripheral surface of the shell 3s.

Thus, while the laser beams L from the laser welding machine W are applied to the outer surface of the support portion 34b of the second power transmission claw 34 during welding, the laser welding machine W and the shell 3s are relatively rotated about an axis of the shell 3s, thereby easily and reliably forming linear welds 40 of a desired length, and giving a desired bonding strength between the support portion 34b and the shell 3s. Moreover, since the linear welds 40 normally melt and reach the inner peripheral surface of the shell to form linear discolored portions on the inner surface, it is possible to easily and reliably determine whether the condition of the welds 40 is good or not only by a visual inspection as to the presence or absence of the discolored portions, thereby contributing to an improvement in quality. In addition, since heat input to the welds 40 formed by the laser beams L is relatively small, it is possible to prevent any thermal distortion of the shell 3s to provide a stable quality of the turbine impeller 3.

Also, the linear weld 40 extending in a circumferential direction D of the shell 3s is formed into a plurality of parallel lines (two lines in the illustrated example) with a space therebetween, and the length C of the welds 40 is set longer than the width B of the claw portion 34a. Further, opposite ends of each weld 40 are terminated in front of edges of the support portion 34b.

Thus, the plural lines of linear welds 40 extending along the circumferential direction D of the shell 3s and longer than the width B of the claw portion 34a, can effectively increase the bonding strength between the support portion 34b and the shell 3s, and the durability of the welds 40 can be improved by dispersing stress over the welds 40 during power transmission. Further, opposite ends of the welds 40 are terminated in front of edges of the support portion 34b, thereby preventing chip-off by melting of the edges of the support portion 34b by the laser beams L to prevent the strength from decreasing due to the chip-off by melting of the edges, so that the welds 40 can bear a large torque transmission.

In addition, a gap g surrounding the welds 40 is provided between opposed faces of the support portion 34b and the shell 3s. Specifically, a radius of curvature r of a curved face of an inner peripheral surface of the support portion 34b opposed to the shell 3s along an arrangement direction of the plural lines of welds 40, is set smaller than a radius of curvature R of a corresponding outer peripheral surface of the shell 3s. As a result, when the support portion 34b is superposed on the outer peripheral surface of the shell 3s in laser welding, the support portion 34b abuts on the outer peripheral surface of the shell 3s at two points in opposite edges along the arrangement direction of the welds 40, to provide a gap g on the other portions between the support portion 34b and the outer peripheral surface of the shell 3s. Thus, when the laser beams L are applied to the outer surface of the support portion 34b at the portion where the above-mentioned gap g is present in order to form plural lines of welds 40 in such a manner that the welds 40 melt and extend from the outer surface of the support portion 34b to the inner peripheral surface of the shell 3s, gas generated at the welds can be rapidly discharged into the surrounding gap g. In particular, if a nitridation layer for securing abrasion resistance is formed beforehand on the second power transmission claw 34, nitrogen gas generated from the nitridation layer can be smoothly discharged into the gap g around the welds 40, thus preventing any blow holes from being generated by the gas to form good-quality welds 40, thereby securing a desired and predetermined bonding strength between the support portion 34b and the shell 3s.

Since the plurality of second power transmission claws 34 are each separate and independent, a large number of second power transmission claws 34 can be punched out of a steel plate with good yield. Moreover, by freely setting the number and the fitting pitch of the second power transmission claws 34 to be used in correspondence to the specification of a torque converter T, they can be applied to various types of torque converters T, thus greatly reducing the manufacturing cost. Also, since the plurality of second power transmission claws 34 are dispersedly arranged on the outer peripheral surface of the turbine impeller 3, no obstruction to the flow of working fluid is present therebetween, thereby smoothening the flow of working fluid to the lock-up clutch Lc, to contribute to an increase in the responsibility.

Figure 5:
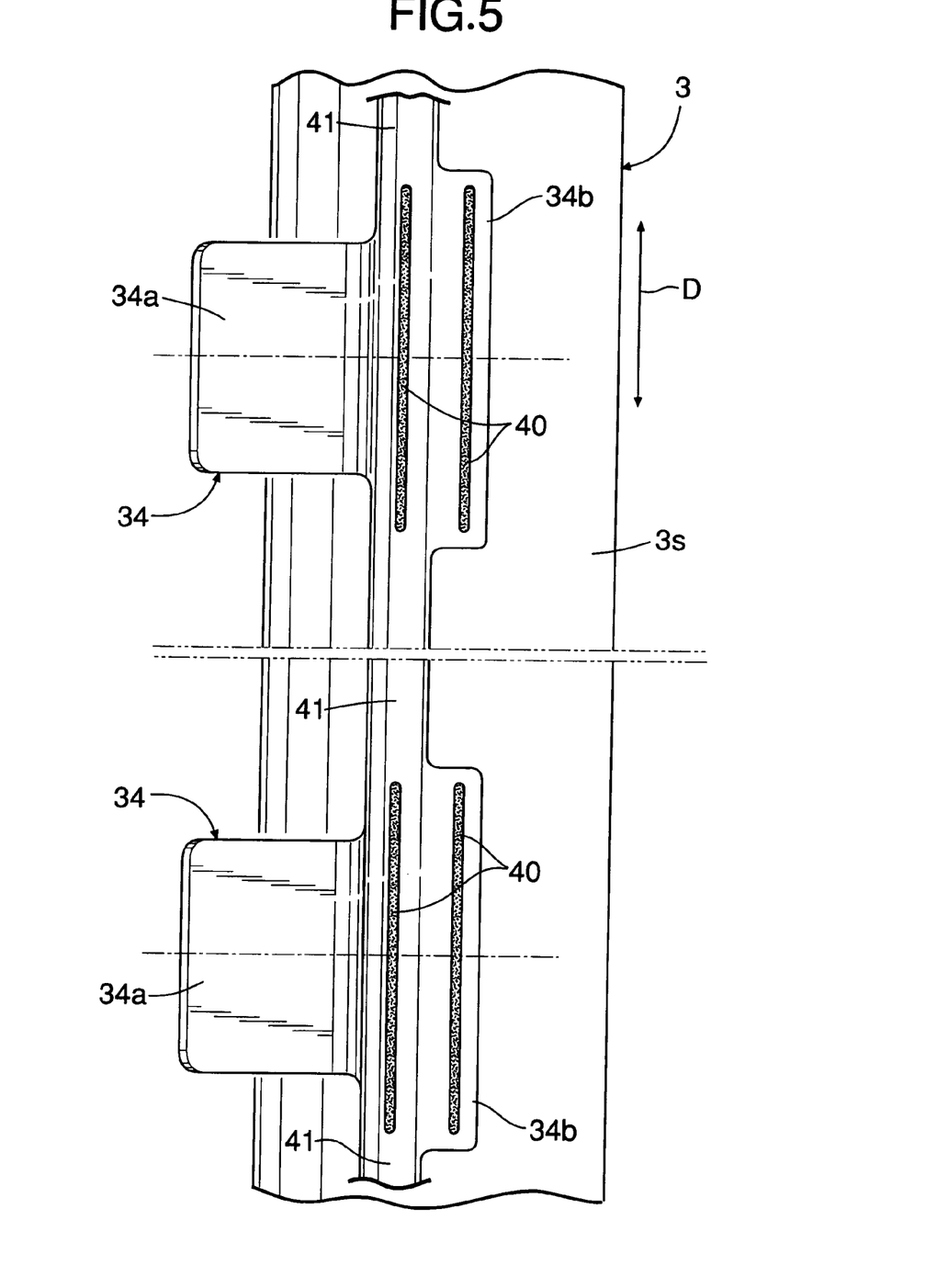
FIG. 5 is a view corresponding to FIG. 4, showing a second embodiment of the present invention.

A second embodiment of the present invention as shown in FIG. 5 will now be described.

The arrangement of the second embodiment is same as that of the first embodiment, except that support portions 34b of a plurality of annually-arranged second power transmission claws 34 are integrally connected to each other via connecting band portions 41 having a width narrower than that of the support portions 34b. Therefore, the support portion 34b of each of the second power transmission claws 34 is bonded to an outer surface of a shell 3s of a turbine impeller 3 via plural lines of linear welds 40 formed by laser beams L, as in the first embodiment. The parts in FIG. 4 corresponding to those of the first embodiment are denoted by the reference numerals same as those of the first embodiment, and the description thereof is omitted.

In the second embodiment, since the support portions 34b of the plurality of second power transmission claws 34 are annually connected via the connecting band portions 41, there is no need to use a positioning fixture for mutually positioning the plurality of second power transmission claws 34 when the support portions 34b are laser welded to the shell 3s, thus improving the efficiency of welding operation. Also, the width of the connecting band portions 41 is narrower than that of the support portions 34b, thereby minimizing an increase in weight due to the connecting band portions 41.

The present invention is not limited to the above-mentioned embodiments, and various modifications in design may be made without departing from the subject matter of the invention. For example, the present invention is applicable to a fluid coupling without any stator impeller.

What is claimed is:

1. A fluid transmitting device with a lock-up clutch, comprising:
    a turbine impeller having a shell; and
    a lock-up clutch including:
        a clutch piston;
        an annular spring accommodation groove formed in the clutch piston to accommodate a plurality of annularly-arranged damper springs;
        a plurality of first power transmission claws inserted between adjacent ones of the damper springs and secured to the clutch piston;
        a plurality of second power transmission claws inserted between adjacent ones of the damper springs so as to face the first power transmission claws, and having a plurality of support portions connected to an outer peripheral surface of the shell of the turbine impeller via a weld formed by laser beams,
    wherein the weld is formed into a linear shape extending along a circumferential direction of the shell so that the weld is melted by the laser beams to extend from an outer surface of the support portion to an inner peripheral surface of the shell.

2. A fluid transmitting device with a lock-up clutch according to claim 1, wherein the linear weld is formed by a plurality of lines juxtaposed to each other with a space therebetween.

3. A fluid transmitting device with a lock-up clutch according to claim 1, wherein each of the second power transmission claws comprises a claw portion and a support portion of the plurality of support portions integrally connected to the claw portion, a width of the support portion in a circumferential direction of the turbine impeller being larger than a width of the claw portion; and wherein the support portion and the shell are connected together via the weld which has a length larger than the width of the claw portion.

4. A fluid transmitting device with a lock-up clutch according to claim 1, wherein the linear weld is formed so that opposite ends thereof do not reach edges of the support portion.

5. A fluid transmitting device with a lock-up clutch according to claim 1, wherein a gap surrounding the weld is provided between opposed faces of the support portion and the shell.

6. A fluid transmitting device with a lock-up clutch according to claim 1, wherein a nitridation layer for securing abrasion resistance is formed on the second power transmission claws.

7. A fluid transmitting device with a lock-up clutch, comprising:
- a turbine impeller having a shell; and
- a lock-up clutch including:
    - a clutch piston;
    - an annular spring accommodation groove formed in the clutch piston to accommodate a plurality of annularly-arranged damper springs;
    - a plurality of first power transmission claws inserted between adjacent ones of the damper springs and secured to the clutch piston;
    - a plurality of second power transmission claws inserted between adjacent ones of the damper springs so as to face the first power transmission claws, and having a plurality of support portions connected to an outer peripheral surface of the shell of the turbine impeller via a weld formed by laser beams,
- wherein the weld is formed into a linear shape extending along a circumferential direction of the shell so that the weld is melted by the laser beams to extend from an outer surface of the support portion to an inner peripheral surface of the shell,
- wherein a gap surrounding the weld is provided between opposed faces of the support portion and the shell, and
- wherein, when the support portion is superimposed on the outer peripheral surface of the shell, a radius of the opposed face of the support portion and a radius of the opposed face of the shell differ from each other so that the support portion abuts on the outer peripheral surface of the shell at two points in opposite edges in radial directions of the shell, and the weld is formed in an intermediate portion between the two points.

8. A fluid transmitting device with a lock-up clutch according to claim 7, wherein the linear weld is formed by a plurality of lines juxtaposed to each other with a space therebetween.

9. A fluid transmitting device with a lock-up clutch according to claim 7, wherein each of the second power transmission claws comprises a claw portion and a support portion of the plurality of support portions is integrally connected to the claw portion, a width of the support portion in a circumferential direction of the turbine impeller being larger than a width of the claw portion; and wherein the support portion and the shell are connected together via the weld which has a length larger than the width of the claw portion.

10. A fluid transmitting device with a lock-up clutch according to claim 7, wherein the linear weld is formed so that opposite ends thereof do not reach edges of the support portion.

11. A fluid transmitting device with a lock-up clutch according to claim 7, wherein a nitridation layer for securing abrasion resistance is formed on the second power transmission claws.

* * * * *